Patented Jan. 3, 1939

2,142,833

UNITED STATES PATENT OFFICE 2,142,833

RESINOUS COMPOSITION AND METHOD OF MAKING THE SAME

Kenneth H. Benton and Robert W. Work, Pittsfield, Mass., assignors to General Electric Company, a corporation of New York No Drawing. Application December 4, 1936, Serial No. 114,262

9 Claims. (Cl. 260—20)

This invention relates broadly to resinous compositions and to methods of making the same. More particularly it relates to a new and useful resinous composition comprising a modified phenol-aldehyde-polyhydric alcohol - polybasic acid resin. Resinous compositions produced in accordance with this invention, when in solution in a volatile solvent, provide an improved wire coating composition.

Enameled wires are produced by drawing the polished wire, for example, copper wire, through a bath of liquid coating composition, whereby the wire is coated therewith. The coated wire is then subjected to heat, for instance, by introducing it into a suitable oven. For such purposes wire-coating compositions containing or prepared from, for example, pitch, asphalt, or natural or synthetic resins mixed with various drying oils heretofore have been used, as also wire enamels comprising mixtures of China-wood, linseed and other drying oils that have been heat bodied and then mixed with a certain amount of calcium resinate or other drier.

To be of maximum practical utility, wire-coating compositions should effectively and fully meet certain definite service requirements. The dried film must withstand frequent bending without cracking and therefore must be very flexible. It must be resistant to acids, alkalies, solvents and to weathering conditions. It must be very resistant to abrasion, which is a property of particular importance during the original winding of the wire on equipment. It must possess good electrical insulating properties and must be hard and tough. Tenacious adherence of the hardened composition to the wire is also a desirable property.

It is a main object of this invention to provide a synthetic resinous material which, in the form of a liquid coating composition, may be applied to surfaces such, for instance, as wire and which upon exposure to adequate heat will form a solid coating thereon that is able effectively to meet such service requirements as hereinbefore mentioned.

A further object of this invention is to provide a resinous material of the kind described which can be made and used in a practical and economical manner.

Other and further objects of this invention will be obvious to those skilled in the art from reading this specification.

For a consideration of what is believed to be novel and the invention, attention is directed to the following specification and the claims appended thereto.

Alkyd resins comprise those complexes resulting primarily from the interaction of a polyhydric alcohol, such as glycerine, and a polybasic acid, such as phthalic acid or its anhydride. Phenol-aldehyde resins are the resultant of the interaction of an aldehyde, such as formaldehyde or paraformaldehyde, with a phenol or a homologue or derivative thereof, such as cresol, xylenol, or para-phenyl-phenol. Each of such types of resins may be modified in various ways, for example, by incorporating therewith drying and other fatty oils and acids, natural resins and resin acids, and other substances. Combinations of the unmodified and modified forms of these types of resins may be obtained by reacting the starting materials in the presence of each other. This invention comprises a new and improved modification of a phenol-aldehyde-alkyd resinous composition and of a method of making the same, which composition has advantageous physical properties that make it especially adaptable for various uses, for example, in a liquid coating composition for coating wires.

Our invention most readily will be understood by reference to the following specific examples of methods of producing the resinous composition of this invention, which examples are merely illustrative in nature:

Example I

|  | Parts by weight |
|---|---|
| Phthalic anhydride | 269 |
| Adipic acid | 354 |
| Glycerol | 270 |
| China-wood oil | 280 |
| Abietic acid | 118 |
| Cresylic acid (xylenols) | 446 |
| Paraformaldehyde | 120 |

The glycerol and China-wood oil, which are immiscible, are heated with the abietic acid in a container provided with a steam-heated reflux condenser until chemical reaction takes place between the three components as evidenced by the homogeneity of a drop on a piece of glass. Advantageously the desired reaction is effected by heating said ingredients together for about 45 minutes to one hour at a temperature of about 250° C. Lower temperatures, for example about 190° to 210° C., may be used but require a much longer period of time to effect the desired reaction. At higher temperatures, for example at about 270° to 280° C., the reaction proceeds more rapidly but is more difficult to control due to the violence of the reaction.

The phthalic anhydride and cresylic acid are added and heating is continued for about 15 to 30 minutes at about 200° C. A temperature of about 170° C. is necessary in order to obtain appreciable reaction. At a temperature above about 210° C. the reaction often proceeds very violently.

The adipic acid is then added and heating is continued above about 170° C., advantageously between about 190° and 210° C., for example at about 200° C., for about 30 to 45 minutes longer. However, in some instances the mixed components must be heated for as long as about 1½ hours after adding the adipic acid in order to obtain the desired result.

The most advantageous temperature for reacting the ingredients after the addition of the phthalic anhydride and cresylic acid must be determined for each resin formula in order that the resin may be made in a reasonable time without having such violent reaction between the ingredients that the mass foams up and out the reflux condenser with loss of material. The period of time the materials are reacted after adding the phthalic anhydride and cresylic acid and again after adding the adipic acid, in each instance, is based upon the fact that cooking must be continued until a drop of the resinous composition placed on a piece of glass would not show crystallization if allowed to stand 24 hours.

The resinous composition that is formed after incorporation of the adipic acid is cooled, for example to a temperature below about 110° C., and the paraformaldehyde is then added. Heating is continued at a temperature between about 110° and about 120° C., for example at about 115° C., to the requisite end-point, which is a 10 to 30 second cure at about 200° C. of a small pill of the material.

In the preparation of some resins of this invention it is necessary, after adding the paraformaldehyde, to increase the temperature of the batch to as high as about 135° C. in order to obtain the desired end-product within a reasonable period of time.

Although we may add the adipic acid to the other components at the same time as the phthalic anhydride and cresylic acid, and such procedure is within the scope of our invention, an improved resin is obtained if the adipic acid is incorporated with the other ingredients subsequent to the addition of the mixture of phthalic anhydride and cresylic acid. The resin produced by the foregoing formula and method may be described for convenience as containing the following:

| | Per cent by weight |
|---|---|
| Alkyd resin | 48.1 |
| Phenol-aldehyde resin | 30.5 |
| Drying oil | 15.1 |
| Natural resin | 6.3 |

The stated substances are wholly or partly in combination one with another.

In the following examples the processing operations are essentially the same as described under Example I.

*Example II*

| | Parts by weight |
|---|---|
| Phthalic anhydride | 148 |
| Sebacic acid | 194 |
| Glycerol | 118 |
| China-wood oil | 153 |
| Abietic acid | 63 |
| Cresylic acid (xylenols) | 244 |
| Paraformaldehyde | 66 |

In the foregoing formula sebacic acid is used in place of adipic acid mentioned in Example I.

The resin produced by the foregoing formula may be described for convenience as containing the following:

| | Per cent by weight |
|---|---|
| Alkyd resin | 46.9 |
| Phenol-aldehyde resin | 31.2 |
| Drying oil | 15.5 |
| Natural resin | 6.4 |

*Example III*

| | Parts by weight |
|---|---|
| Phthalic anhydride | 148 |
| Sebacic acid | 194 |
| Glycerol | 118 |
| China-wood oil | 153 |
| Abietic acid | 63 |
| Phenol | 244 |
| Paraformaldehyde | 78 |

In the foregoing formula phenol is used in place of cresylic acid mentioned in Example II.

The resin produced by the foregoing formula may be described for convenience as containing the following:

| | by weight Per cent |
|---|---|
| Alkyd resin | 46.4 |
| Phenol-aldehyde resin | 32.1 |
| Drying oil | 15.3 |
| Natural resin | 6.2 |

*Example IV*

| | Parts by weight |
|---|---|
| Phthalic anhydride | 148 |
| Adipic acid | 194 |
| Glycerol | 109 |
| Ethylene glycol | 41 |
| China-wood oil | 156 |
| Abietic acid | 63 |
| Cresylic acid (xylenols) | 244 |
| Paraformaldehyde | 66 |

In the foregoing formula ethylene glycol is used in place of a part of the glycerol mentioned in preceding examples, the other ingredients of the formula being the same as in Example I.

The resin produced by the foregoing formula may be described for convenience as containing the following:

| | Per cent by weight |
|---|---|
| Alkyd resin | 47.8 |
| Phenol-aldehyde resin | 30.7 |
| Drying oil | 15.3 |
| Natural resin | 6.2 |

*Example V*

Same formula as Example I with the exception that in place of abietic acid there is used a resinous material comprising a pine wood pitch obtained by the extraction of pine wood and comprising oxidized resin acids, oxidized terpenes, polyphenols and polymerized terpenes. Such a material is described, for example, in United States Patent No. 2,060,856, issued November 17, 1936, to J. M. De Bell. Resinous material of this kind is produced and sold by the Hercules Powder Company under the trade-mark "Vinsol".

*Example VI*

| | Parts by weight |
|---|---|
| Phthalic anhydride | 269 |
| Adipic acid | 354 |
| Glycerol | 300 |
| Linseed oil fatty acids | 268 |
| Abietic acid | 118 |
| Cresylic acid | 446 |
| Paraformaldehyde | 120 |

In the foregoing formula linseed oil fatty acids are employed in place of China-wood oil. Also, about 10 per cent more glycerol is used as compared with Example I.

The resin produced by the foregoing formula may be described for convenience as containing the following:

| | Per cent by weight |
|---|---|
| Alkyd resin | 49.2 |
| Phenol-aldehyde resin | 30.2 |
| Drying oil | 14.3 |
| Natural resin | 6.3 |

We have found that for the preparation of satisfactory wire-coating compositions which meet the requirements hereinbefore set forth, the synthetic resin composition must be kept within the following range expressed as per cent by weight of the component ingredients:

| | Per cent by weight |
|---|---|
| Alkyd resin | 40 to 70 |
| Phenol-aldehyde resin | 10 to 40 |
| Drying oil | 5 to 35 |
| Natural resin | 2 to 20 |

A resin varied in composition within the ranges immediately hereinbefore-described is especially suitable in making varnishes for use in coating wires because of the homogeneity, hardness, flexibility, and electrical insulating properties of the resultant film. This is due in large part to the method of combining the various ingredients, whereby, whatever the actual linkages between the various components may be, an improved resinous composition is obtained that is substantially different in its useful properties from resinous compositions prepared from the same starting materials but combined by a method different from that herein set forth.

A liquid coating composition may be prepared from synthetic resin produced in accordance with this invention, for example, as follows:

The resin after having been brought to the desired cure point is added while hot and in fluid state to a suitable volatile solvent and is mixed therewith to form a clear, homogeneous solution. The volatile solvent advantageously may be a mixture of true solvent for the resin and a liquid diluent, the percentage proportion of the latter being dependent both upon the composition of the particular resin and the chemical composition of both the true solvent and the diluent. The true solvent may be, for example, normal butyl alcohol, iso-amyl alcohol, the isomeric amyl alcohols, monoethyl ether of ethylene glycol, monobutyl ether of ethylene glycol, monoethyl ether of diethylene glycol, and the like. Examples of suitable diluents are aromatic hydrocarbons such as xylol and solvent naphthas, of petroleum origin, comprising aromatic hydrocarbons. For the most part the composition of the volatile solvent is varied between about 10 to 30 per cent true solvent and about 90 to 70 per cent diluent. Of course, if desired, the amount of true solvent may be increased to 100 per cent. Because the true solvents are more expensive than the diluents, we prefer to employ a mixed solvent containing the least possible proportion of true solvent and yet obtain a clear, homogeneous solution. For enameling wire our preferred liquid coating composition consists of about 20 to 30 per cent synthetic resin produced in accordance with this invention and about 80 to 70 per cent volatile solvent.

The wire coating composition is applied to the wire in accordance with methods well known to the art. The film of resin initially deposited and subsequently baked on the wire is smooth, uniform, hard, heat-infusible and highly resistant to abrasion. It has very good electrical insulating properties. It possesses excellent resistance to heat shock, heat aging and solvents such, for example, as petroleum naphtha, xylol and hot varnish. The film is very flexible. Enameled wires of this invention have been stretched from 25 per cent to the point of breaking of the wire before cracking the coating.

By variations in the formula it is possible to produce a liquid coating composition, or a wire enamel and an enameled wire, especially adapted for a particular use. For example, fractional horse-power motors require an enameled wire that is extremely resistant to abrasion and that will withstand frequent bending without cracking of the enamel. On the other hand distribution transformers require the use of a wire having thereon a coating that is adequately hard and resistant to solvent during varnish treatment and resistant to oil when in service. In other applications still other properties of the coating are of greater or lesser importance. Wire coating compositions suitable for a wide variety of uses may be produced by this invention. The resinous composition of this invention also may be employed in making other liquid coating compositions for use, for example, in varnish treating wound and assembled pieces of electrical equipment, in coating metallic surfaces other than wires, and for application to fibrous materials such as wood, paper, cloth and the like.

It is, of course, to be understood that this invention is not limited to the specific ingredients named in the illustrative examples. For instance, we may employ polyhydric alcohols other than glycerol, especially those having three or more hydroxyl groups in the molecule, such as mannitol, pentaerythritol, and the like; and such dihydric alcohols other than ethylene glycol as diethylene glycol, propylene glycol, tetramethylene glycol and the like. Aromatic polybasic acids or anhydrides or resin-forming derivatives thereof other than phthalic acid or its anhydride may be used. In place of adipic or sebacic acids other aliphatic dibasic acids may be employed, for example, succinic, glutaric, pimelic, suberic, fumaric, malic, maleic and the like, although as the hydrocarbon chain of the aliphatic dibasic acid is lengthened the less glyceryl dibasic aliphatic acid is required for a given amount of glyceryl phthalate to produce a given flexibility. We may use instead of formaldehyde or paraformaldehyde other aldehydes such, for example, as furfural and acetaldehyde; and in place of phenol or xylenols (cresylic acid) we may use other phenolic compounds, for example, cresol or substituted phenols such as para-phenyl-phenol, para-tertiary-butyl phenol or para-tertiary-amyl phenol. Instead of wood rosin, abietic acid, or other derivatives of, or products obtained from wood rosin, we may use other natural resins or the acids derived therefrom, for example, dammar, kauri, copal and the like. In place of China-wood oil or linseed oil or acids derived therefrom, other vegetable oils, for instance, castor oil, corn oil and the like, may be employed, and particularly such other drying oils or acids therefrom as Perilla oil or its acids, soya bean oil or its acids, and the like.

Within the term "natural resin" as used in the claims which follow, we intend to include the acids thereof. The terms "vegetable oil" and "drying oil" include within their meaning the acids of such oils. The term "a phenol" is intended to include both the organic compound having the empirical formula $C_6H_5OH$ and homologues and derivatives thereof capable of reacting with an aldehyde to form a resinous composition. The term "aromatic polybasic acid" includes the anhydrides of such acids and resin-forming derivatives thereof.

What we claim as new and desire to secure by Letters Patent of the United States, is:

1. The process of making a resinous composition consisting of the product of reaction of

|  | Per cent by weight |
|---|---|
| Resinous reaction product of polyhydric alcohol, aromatic polycarboxylic acid and aliphatic dicarboxylic acid | 40 to 70 |
| Phenol-aldehyde resin | 10 to 40 |
| Vegetable oil | 5 to 35 |
| Natural resin | 2 to 20 | said process comprising heating together the polyhydric alcohol, vegetable oil and natural resin at a temperature and for a period of time sufficient to effect at least partial interaction of said ingredients, adding the aromatic polycarboxylic acid, aliphatic dicarboxylic acid and phenol thereto, heating the whole at a temperature and for a period of time sufficient to effect at least partial esterification of the acids and linkage of the phenol to the interacted components, cooling the resultant product, adding the aldehyde to said product for reaction therewith, and cooking the whole to the requisite end-point which is a 10 to 30 second cure at about 200° C. of a small pill of the material.

2. The process of making a resinous composition consisting of the product of reaction of

|  | Per cent by weight |
|---|---|
| Resinous reaction product of glycerol, phthalic anhydride and adipic acid | 40 to 70 |
| Resinous reaction product of cresylic acid and paraformaldehyde | 10 to 40 |
| Drying oil | 5 to 35 |
| Natural resin | 2 to 20 | said process comprising heating together the glycerol, drying oil and natural resin at a temperature and for a period of time sufficient to effect at least partial interaction of said ingredients, adding the phthalic anhydride, adipic acid and cresylic acid thereto, heating the whole at a temperature and for a period of time sufficient to effect at least partial esterification of the acids and linkage of the cresylic acid to the interacted components, cooling the resultant product, adding the paraformaldehyde to said product for reaction therewith, and heating the whole at a temperature between about 110° and about 135° C. to the desired end-point.

3. A resinous composition which is the product of the process of claim 1.

4. A resinous composition which is the product of the process of claim 2.

5. A liquid coating composition comprising a volatile solvent and a synthetic resin which is the product of the process of claim 1.

6. The method of making a resinous composition which comprises heating together, by weight, 270 parts glycerol, 280 parts China-wood oil and 118 parts abietic acid at a temperature and for a period of time sufficient to effect at least partial interaction of said ingredients, adding 269 parts phthalic anhydride, 354 parts adipic acid and 446 parts cresylic acid thereto, heating the whole at a temperature and for a period of time sufficient to effect at least partial esterification of the acids and linkage of the cresylic acid to the interacted components, cooling the resultant product, adding 120 parts paraformaldehyde to the cooled product, and reacting the paraformaldehyde therewith at an elevated temperature until a resinous mass of the desired cure point has been obtained.

7. A resinous composition which is the product of the method of claim 6.

8. A resinous composition which is the baked product of the method of claim 6.

9. A liquid coating composition comprising a volatile solvent and a synthetic resin which is the product of the method of claim 6.

KENNETH H. BENTON.
ROBERT W. WORK.